United States Patent
Nazari et al.

(10) Patent No.: US 11,379,513 B2
(45) Date of Patent: Jul. 5, 2022

(54) SYSTEMS AND METHODS FOR PROVIDING CONTENT BASED ON CONSUMPTION IN A DISTINCT DOMAIN

(71) Applicant: Spotify AB, Stockholm (SE)

(72) Inventors: Zahra Nazari, New York City, NY (US); Christophe Charbuillet, New York City, NY (US); Johan Pages, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/997,593

(22) Filed: Aug. 19, 2020

(65) Prior Publication Data
US 2021/0064649 A1    Mar. 4, 2021

Related U.S. Application Data

(60) Provisional application No. 62/894,520, filed on Aug. 30, 2019.

(51) Int. Cl.
*G06F 16/435*    (2019.01)
*G06F 16/438*    (2019.01)
*G06F 16/483*    (2019.01)

(52) U.S. Cl.
CPC ........ *G06F 16/437* (2019.01); *G06F 16/4387* (2019.01); *G06F 16/483* (2019.01)

(58) Field of Classification Search
CPC ... G06F 16/437; G06F 16/483; G06F 16/4387
USPC ....................................................... 707/734
See application file for complete search history.

(56) References Cited

U.S. PATENT DOCUMENTS

| | | | |
|---|---|---|---|
| 613,118 | A | 10/1898 | Carrier |
| 9,613,118 | B2 * | 4/2017 | Whitman .............. G06F 16/735 |
| 2014/0074650 | A1 | 3/2014 | Elias |
| 2019/0066186 | A1 | 2/2019 | Singh et al. |

(Continued)

FOREIGN PATENT DOCUMENTS

EP    2207348 A2    7/2010

OTHER PUBLICATIONS

Carman, Spotify test placing podcast episodes alongside music recommendations, The Verge, May 1, 2019, downloaded from https://www.theverge.com/2019/5/1/18525550/spotify-playlist-daily-drive-algorithm-recommendation, 3 pgs.

(Continued)

*Primary Examiner* — Kimberly L Wilson
(74) *Attorney, Agent, or Firm* — Morgan, Lewis & Bockius LLP

(57) ABSTRACT

A server obtains user data corresponding to a first content domain. The server identifies, from the user data, a plurality of labels. A respective label of the plurality of labels corresponds to a distinct characteristic of content items of the first content domain. The server utilizes a neural network to generate a plurality of user embeddings. A respective user embedding of the plurality of user embeddings includes a plurality of labels that correspond to a respective user. The server determines, using the plurality of user embeddings, a first content item of a plurality of content items of a second type that meets matching criteria for a first user. The server further provides, to a device of the first user, information that corresponds to the first content item of the second content domain.

19 Claims, 11 Drawing Sheets

(56) References Cited

U.S. PATENT DOCUMENTS

2020/0089724 A1\* 3/2020 Zimovnov .......... G06F 16/2457
2020/0110783 A1\* 4/2020 Ushanov .................. G06N 3/04

OTHER PUBLICATIONS

Winoto et al., If You Like the Devil Wears Prada the Book, Will You Also Enjoy the Devil Wears Prade the Movie? A Study of Cross-Domain Recommendations, New Generation Computing, Ohmsha Ltd and Springer 2008, Jun. 4, 2008, downloaded from https://link.springer.com/article/10.1007/s00354-008-0041-0, 17 pgs.

\* cited by examiner (C)

834
Providing, to a device of the first user, information that corresponds to the first content item of the plurality of content items of the second content domain

836
Providing, to the device of the first user, information corresponding to the one or more ranked content items of the second content domain in descending order based on rank

838
The provided information corresponding to the first content item of the plurality of content items of the second content domain is incorporated into the user data corresponding to the first user

840
Prior to incorporating the provided information corresponding to the first content item of the plurality of content items of the second content domain into the user data corresponding to the first user:
840-1
Receiving, from a device of the first user, an indication of a response to the first content item of the plurality of content items of the second content domain; and
840-2
Including, in the provided information corresponding to the first content item of the plurality of content items of the second content domain, the indication of the response to the first content item of the plurality of content items of the second content domain.

842
The indication of the response to the first content item of the plurality of content items of the second content domain includes at least one of a playback, a subscription corresponding to the first content item of the plurality of content items of the second content domain, a purchase corresponding to the first content item of the plurality of content items of the second content domain, completion of the first content item of the plurality of content items of the second content domain, or feedback for the first content item of the plurality of content items of the second content domain

Figure 8D

SYSTEMS AND METHODS FOR PROVIDING CONTENT BASED ON CONSUMPTION IN A DISTINCT DOMAIN

RELATED APPLICATION

This application claims priority to U.S. Provisional Application No. 62/894,520, filed Aug. 30, 2019, which is hereby incorporated by reference in its entirety.

TECHNICAL FIELD

The disclosed embodiments relate generally to media recommendations, and, in particular, to providing personalized media content across different types of media.

BACKGROUND

Access to electronic media, such as music and podcast content, has expanded dramatically over time. As the availability of media content increases, media content providers recommend new content to their users based on historic consumption of media content, improving the convenience with which users can discover new media content to explore and consume.

As part of the service they provide and to assist users in discovering new content, media content providers track and process user data in an attempt to understand user preferences, and ultimately to provide relevant content to users.

SUMMARY

A system uses information about content of a first domain (e.g., music) to provide information about content of a second domain (e.g., podcasts) to a user. For example, podcasts are identified and provided (e.g., for consumption and/or streaming) to a user, without a need for information about podcasts that the user has previously consumed. The system obtains, for multiple users, user data that includes content information (e.g., information related to listening history such as listening context and/or metadata) for a first content domain (e.g. music tracks). The system may also include user demographic information in the user data. The user data is provided as input into a neural network that generates embeddings for the user data and embeddings for a second content domain based on the user data for the first content domain. The embeddings for the user data and the embeddings for the second content domain are used to select content of the second domain for a user (e.g., by performing a nearest neighbor analysis). For example, a podcast is recommended to a user based on similarity between characteristics of the user who does not have a history of listening to podcasts (e.g., music tracks consumed by the user) and characteristics of other users (e.g., music tracks consumed by the other users) who listen to podcasts.

In accordance with some embodiments, a method is performed at a computer (e.g., associated with a media content provider) having one or more processors and memory storing instructions for execution by the one or more processors. The method includes obtaining user data corresponding to a first content domain. The method further includes identifying, from the user data, a plurality of labels. A respective label of the plurality of labels corresponds to a distinct characteristic of content items of the first content domain. The method includes utilizing a neural network to generate a plurality of user embeddings. A respective user embedding of the plurality of user embeddings includes a plurality of labels that correspond to a respective user. The method further includes determining, using the plurality of user embeddings, a first content item of a plurality of content items of a second domain that meets matching criteria for a first user. The method includes providing, to a device of the first user, information that corresponds to the first content item of the plurality of content items of the second content domain.

In accordance with some embodiments, an electronic device (e.g., a server system, a client device, etc.) includes one or more processors and memory storing one or more programs configured to be executed by the one or more processors. The one or more programs include instructions for performing the operations of the method described above. In accordance with some embodiments, a computer-readable storage medium has stored therein instructions that, when executed by an electronic device, cause the server system to perform the operations of the method described above.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 8A-8D are flow diagrams illustrating methods for media-providing service in accordance with some embodiments.

DETAILED DESCRIPTION

Figure 1:
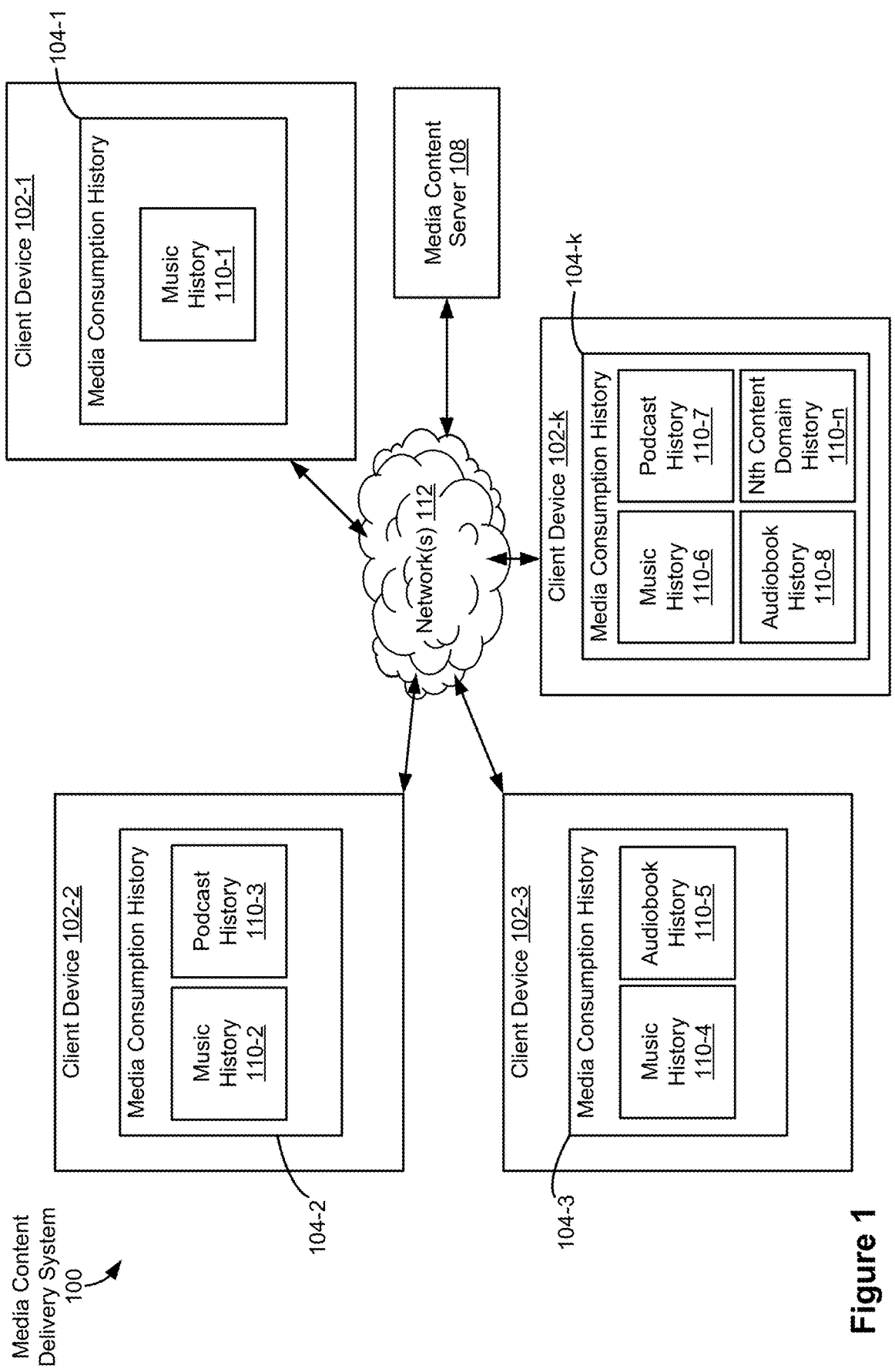
FIG. 1 is a block diagram illustrating a media content delivery system in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first client device could be termed a second client device, and, similarly, a second client device could be termed a first client device, without departing from the scope of the various described embodiments. The first client device and the second client device are both client devices, but they are not the same client device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The rapid growth in the availability and creation of media content, such as music and podcasts, creates new opportunities to recommend new media content across a number of different content domains to users. For example, improving the content that is recommended and/or provided to a user by a media-providing platform (e.g. a music platform) enables the user to discover media content from a particular media content domain (e.g., even if the user has limited familiarity with that media content domain). For example, a client device of a user may be provided with information for content and/or streamed content in a first domain (e.g., music) without a need for information about content in that domain that user has previously consumed. For example, even if a user has not listened to podcasts, information about content in a different target content domain (e.g., podcast) that has been consumed by the user is used for providing information about podcasts.

The methods and systems described herein increase the efficiency with which a user client device is provided with information about a content item in a content domain by using a neural network to determine content items in the content domain that meet matching criteria for the user (e.g., by providing the information to the user device without requiring user input to indicate areas of interest or search for content of interest). Reducing the amount of input required from the user reduces the extent to which user input data is required by a media-providing service and reduces the processing power and power consumption required for providing information to the user client device, thereby improving the functioning of one or more devices associated with the media-providing service.

FIG. 1 is a block diagram illustrating a media content delivery system 100 in accordance with some embodiments. The media content delivery system 100 includes one or more client devices 102 (e.g., client device 102-1 to client device 102-k, where k is an integer greater than one) and one or more media content servers 108. The one or more media content servers 108 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, client devices 102-1, 102-2, 102-3 and/or 102-k is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). Client device 102 includes a media consumption history 104 that indicates media content that has been consumed by the user of client device 102. For example, client device 102-1 includes media consumption history 104-1, client device 102-2 includes media consumption history 104-2, client device 102-3 includes media consumption history 104-3, and client device 102-k includes media consumption history 104-k. Although FIG. 1 indicates that media consumption history 104 is stored by a client device 102, it will be recognized that in some embodiments a media consumption history 104 for a client device 102 is stored by a media content server 108.

Media consumption history 104 includes a history of media consumption in one or more content domains, as illustrated by content domain histories 110. In some embodiments, the content domain histories 110 include consumed (e.g., partial and/or fully) media items, saved media content items, shared media content items, subscriptions associated with the media content items, playlists (e.g., user created, shared, or followed), purchases associated with the media content items, completed and/or skipped media content items, repeatedly consumed media content items, and/or feedback corresponding to media items. Content domains are distinct categories and/or classifications for an entire class of one or more content items. For example, music is associated with a first content domain that includes one or more distinct music content items, each music content item includes metadata and/or other associated information. Similarly, podcasts are associated with a distinct (e.g. second) content domain that includes one or more distinct podcast content items, each podcast content item includes metadata and/or other associated information. Further examples of content domains include audiobooks, standup comedy, movies, books, magazines, and/or other variations.

In some embodiments, the media consumption history 104 includes a history of content consumed by a user in one or more domains (e.g., content domain history data). For example, media consumption history 104-1 for client device 102-1 includes music history 110-1 (e.g., historical data indicating music content that the user of device 102-1 has consumed); media consumption history 104-2 for client device 102-2 includes music history 110-2 (e.g., historical data indicating music content that the user of device 102-1 has consumed) and podcast history 110-3 (e.g., historical data indicating podcast content that the user of device 102-2 has consumed); media consumption history 104-3 for client device 102-3 includes music history 110-4 (e.g., historical data indicating music content that the user of device 102-3 has consumed) and audiobook history 110-5 (e.g., historical data indicating audiobook content that the user of device 102-3 has consumed); and media consumption history 104-*k* for client device 102-*k* includes music history 110-6, podcast history 110-7, audiobook history 110-8, and/or Nth content domain history 110-*n* (e.g., Nth content domain includes any number of distinct content domains). Both the content domain history and the media content items associated with the media content domain are provided by the media-providing service.

Figure 2:
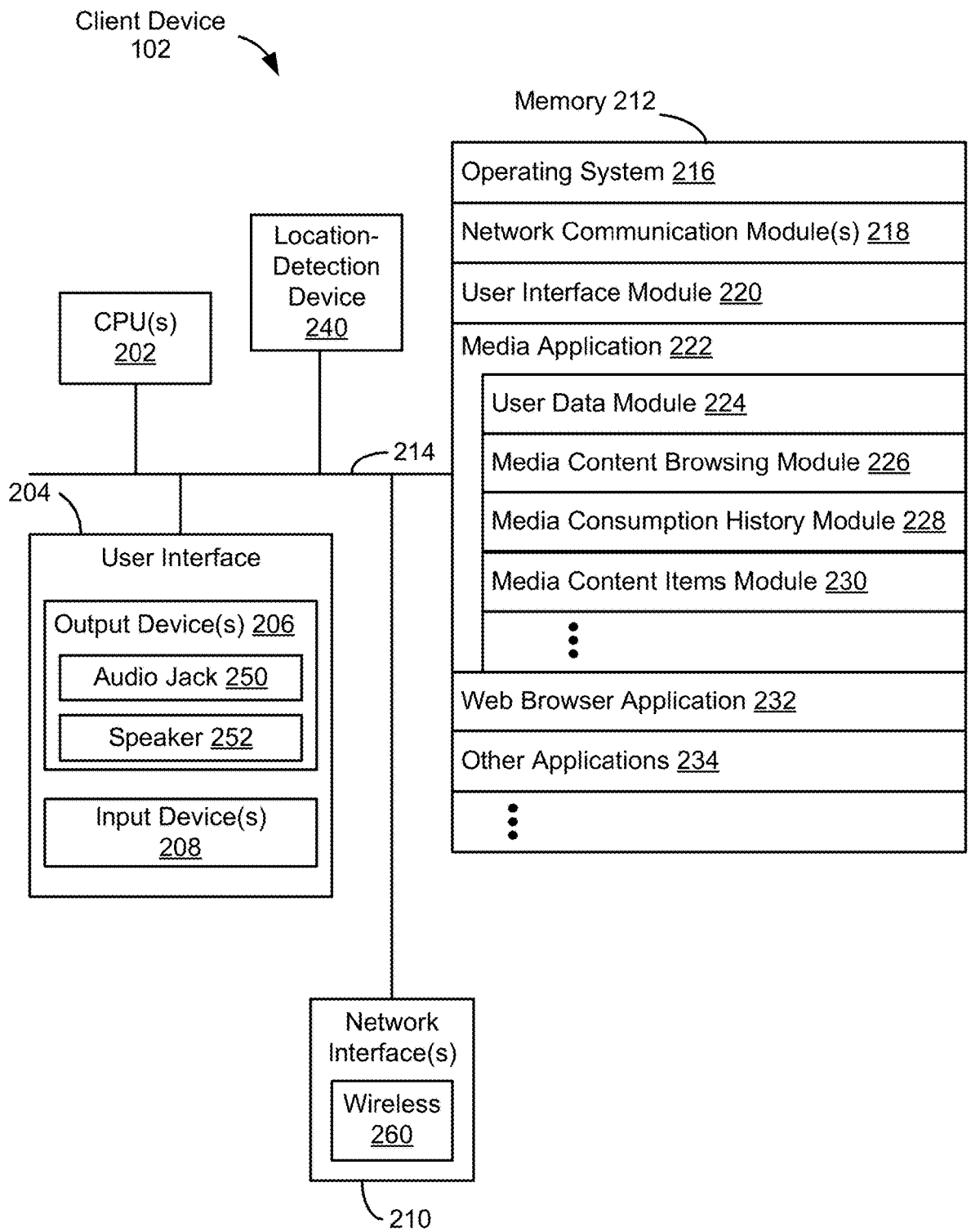
FIG. 2 is a block diagram illustrating a client device in accordance with some embodiments.

In some embodiments, client devices 102-1, 102-2, 102-3, and/or 102-*k* send and receive media content information through the networks 112. For example, client devices 102-1, 102-2, and/or 102-*k* send media content information (e.g., as described in User Data module 224; FIG. 2) to media content server 108 through network(s) 112. In some embodiments, media content may be stored locally (e.g., in memory 212 of the client device 102, FIG. 2) and/or received in a data stream (e.g., from the media content server 108) that is included in the content domain history associated with the media consumption history 104.

In some embodiments, media server 108 utilizes collaborative transfer to include collaborative filtered data in the recommendation of media content. Collaborative filtering analyzes media consumption histories 104 of multiple users (e.g., media history 104-1 of client device 102-1, media history 104-2 of client device 102-2, media history 104-3 of client device 102-3, and media history 104-*k* of client device 102-*k*) to generate predictions for a user's interest. For example, collaborative filtering analyzes music history 110-1 for client device 102-1, music history 110-2 for client device 102-2, music history 110-4 for client device 102-3, music history 110-6 for client device 102-*k* to determine (e.g. predict) client-device's 102-1 interest in a particular song passed based on their music history 110-1 as well as music history 110-2, music history 110-4, and music history 110-6. In some embodiments, the prediction is based on media content items consumed and included in the content domain history (e.g., music history 110-1), user defined preferences, and/or determined preferences based on a user's media content items consumption within the content domain over time.

In some embodiments, collaborative transfer is utilized to define contextual information in order to determine a media content item to provide the user of a client device (e.g., in association with a context in which the client device is operated). For example, collaborative transfer information indicates times at which particular media content items are consumed; locations at which particular media content items are consumed; social information such as events, parties, friends, family, etc. and the particular media content items consumed in those situations and/or with those contacts; and type of device that a user is using and the media content items that are played on the device (e.g., speakers, television, headphones, etc.). In some embodiments, client devices 102-1, 102-2, 102-3, and/or 102-*k* receive recommended media content information from the media content server 108 through network(s) 112.

In some embodiments, collaborative transfer data includes information corresponding to the similarity of media content items in a particular content domain. The similarity of media content items in the content domain are based on similar context in which the media content items in the content domain are consumed, similarities in users, and/or the similar situations in which the media content items in the particular content domain are consumed. For example, collaborative transfer data includes information corresponding to the time of day that one or more media content items are consumed; the locations at which the one or more media content items are consumed such as the office, car, home, park, etc.; social information and/or context such as, friends; family; parties and other gatherings; emotional context such as media content items related to happiness, sadness, anger, motivational, etc.; behavioral context such as media content items used to exercise, work, cook, read, etc.; and/or type of device that a user is using (e.g. television, mobile device, computer, portable speakers, and/or other media presentation systems).

FIG. 2 is a block diagram illustrating a client device 102 (e.g., client device 102-1, 102-2, 102-3 and/or client device 102-*k*, FIG. 1), in accordance with some embodiments. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The client device 102 includes a user interface 204, including output device(s) 206 and input device(s) 208. In some embodiments, the input devices 208 include a keyboard, mouse, and/or track pad. Alternatively, or in addition, in some embodiments, the user interface 204 includes a display device that includes a touch-sensitive surface, in which case the display device is a touch-sensitive display. "User input," as described herein, may refer to a contact detected with a touch-sensitive display and/or an input by an input device 208. In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 240, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 210 include wireless and/or wired interfaces for receiving data from and/or transmitting data to other client devices 102, a media content server 108, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other client devices 102, media content server 108, and/or or other wireless (e.g., Bluetooth-compatible) devices (e.g., for streaming audio data to an automobile, television, portable speakers, etc.). Furthermore, in some embodiments, the wireless interface 260 (or a different communications interface of the one or more network interfaces 210) enables data communications with other WLAN-compatible devices (e.g., portable speakers, television, etc.) and/or the media content server 108 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media content server 108, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 108, including a media player, a streaming media application, or any other appropriate application or component of an application) for browsing, receiving, processing, presenting, and requesting playback of media (e.g., media items). The media application 222 is also used to monitor, store, and/or transmit (e.g., to media content server 108) data associated with user behavior, preferences, and media consumption. The media application 222 may include the following modules (or sets of instructions), or a subset or superset thereof:
  - user data module 224 for storing and accessing user information and account information associated with a user of the media-providing service, the user data module 224 including:
    - user demographic information including location information (e.g., country, state, hometown, residence, current location, etc.), age and/or age range (e.g. 18-25, 25-30, 30-40, etc.), gender and/or self-identification, and/or includes language preferences (e.g., English, Spanish, Korean, Japanese, etc.);
    - user media content consumption information including media content items partially or fully consumed, playlist information (e.g., user created, followed, and/or shared playlists), media content items that are repeatedly consumed, skipped. User media content consumption information includes liked, favorited, and/or disliked media content items, playlists, and/or media content item metadata (e.g. genre, artist, micro-genre, meta-genre, artist affinity, etc.); and
    - user selected preference information including user identified preferences for media content items, user's preferred characteristics for media content items, and/or parental controls;
  - a media content browsing module 226 for providing controls and/or user interfaces enabling a user to navigate, search, select for playback, and otherwise control or interact with media content, whether the media content is stored or played locally or remotely;
  - a media consumption history module 228 for processing (e.g., compiling) and storing data (e.g., in a media consumption history) relating to media content items and playlists that a user has consumed from the media-providing service (e.g., each user of the media-providing service has at least one content domain hi story);
  - a media content items module 230 for storing media items for playback; and
- a web browser application 232 (e.g., Internet Explorer or Edge by Microsoft, Firefox by Mozilla, Safari by Apple, or Chrome by Google) for accessing, viewing, and interacting with web sites; and
- other applications 234, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
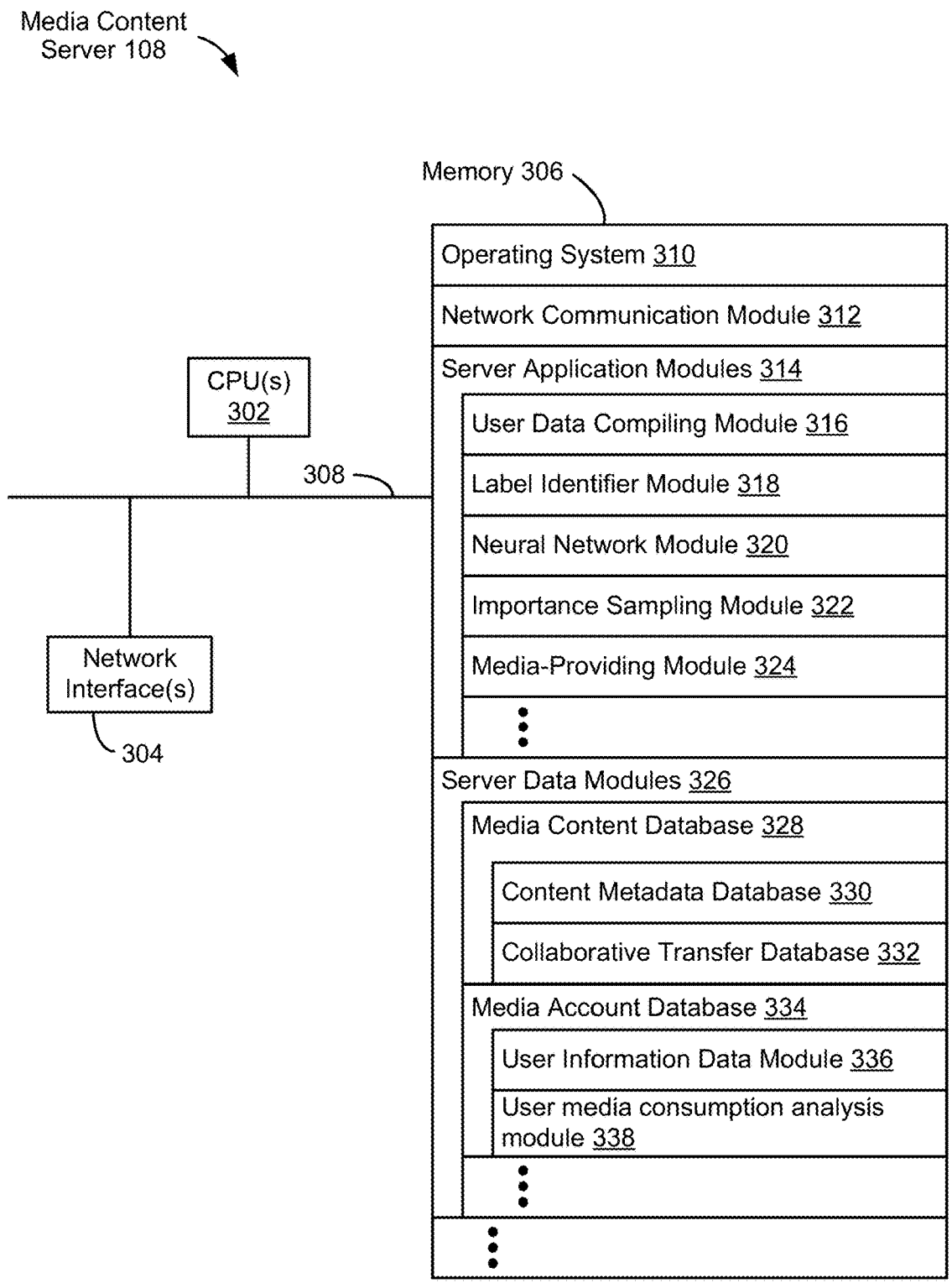
FIG. 3 is a block diagram illustrating a media content server in accordance with some embodiments.

FIG. 3 is a block diagram illustrating a media content server 108 in accordance with some embodiments. The media content server 108 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 108 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a user data compiling module 316 for consolidating media content information for a content domain and generating distinct characteristics for the user data;

a label identifier module 318 for processing and/or identifying one or more labels for distinct characteristics of user data for a content domain and concatenating the identified one or more labels into an embedding for a user;

a neural network module 320 (e.g., neural network 430, FIG. 4) for processing the plurality of labels to generate user embeddings;

importance sampling module 322 for processing embeddings and improving the efficiency of the system by assigning weighted values to labels and/or specific attributes of content item embeddings;

a media-providing module 324 for providing a content item from a content domain associated with content not previously consumed (or consumed less than a threshold amount) by a user. The media-providing module 324 processes user embeddings and content embeddings to determine matching criteria and/or nearest neighbors; and one or more server data module(s) 326 for handling the storage of and access to user information, media content, metadata relating to the media items, user content consumption history, and collaborative transfer data; in some embodiments, the one or more server data module(s) 326 include:

a media content database 328 for storing and accessing media content items (e.g., audio files, video files, text files, etc.) provided by the media-providing service, the media content database 328 including:

a content metadata database 330 for storing and accessing metadata associated with media content items provided by the music-providing service (e.g. genre, artist, micro-genre, macro-genre, artist, artist affinity, etc.); and a collaborative transfer database 332 for storing and accessing collaborative filtering data corresponding to contexts in which the media content items are consumed; and a media account database 334 for storing and accessing account information for user media accounts, including user profiles, credentials (e.g., user identifiers, passwords, email addresses, etc.), credentials or identifiers of any linked accounts, and the like, the media account database 334 including:

a user information data module 336 for storing, compiling, and accessing user data and media content consumed by a user. The user information data module 336 includes user data (e.g., as described above with respect to the user data module 224 in FIG. 2); and;

a user media consumption analysis module 338 for processing (e.g. analyzing) media content items consumed by a user of the media providing service. The media consumption analysis module 338 includes determining a user's media content consumption preference over the user's continued use of the media-providing platform and/or determining collaborative filtering data for a user based on media consumption of all users of the media-providing service.

In some embodiments, the media content server 108 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, modules described with regard to memory 212 are stored in memory 306 (and vice-versa). For example, the media providing module 324 may be stored at the media content server 108 in memory 306 and/or stored in memory 212 at the client device 102.

Although FIG. 3 illustrates the media content server 108 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the media content server 108, and how features are allocated among them, will vary from one embodiment to another and, optionally, depends in part on the amount of data traffic that the server system handles during peak usage periods as well as during average usage periods.

Figure 4:
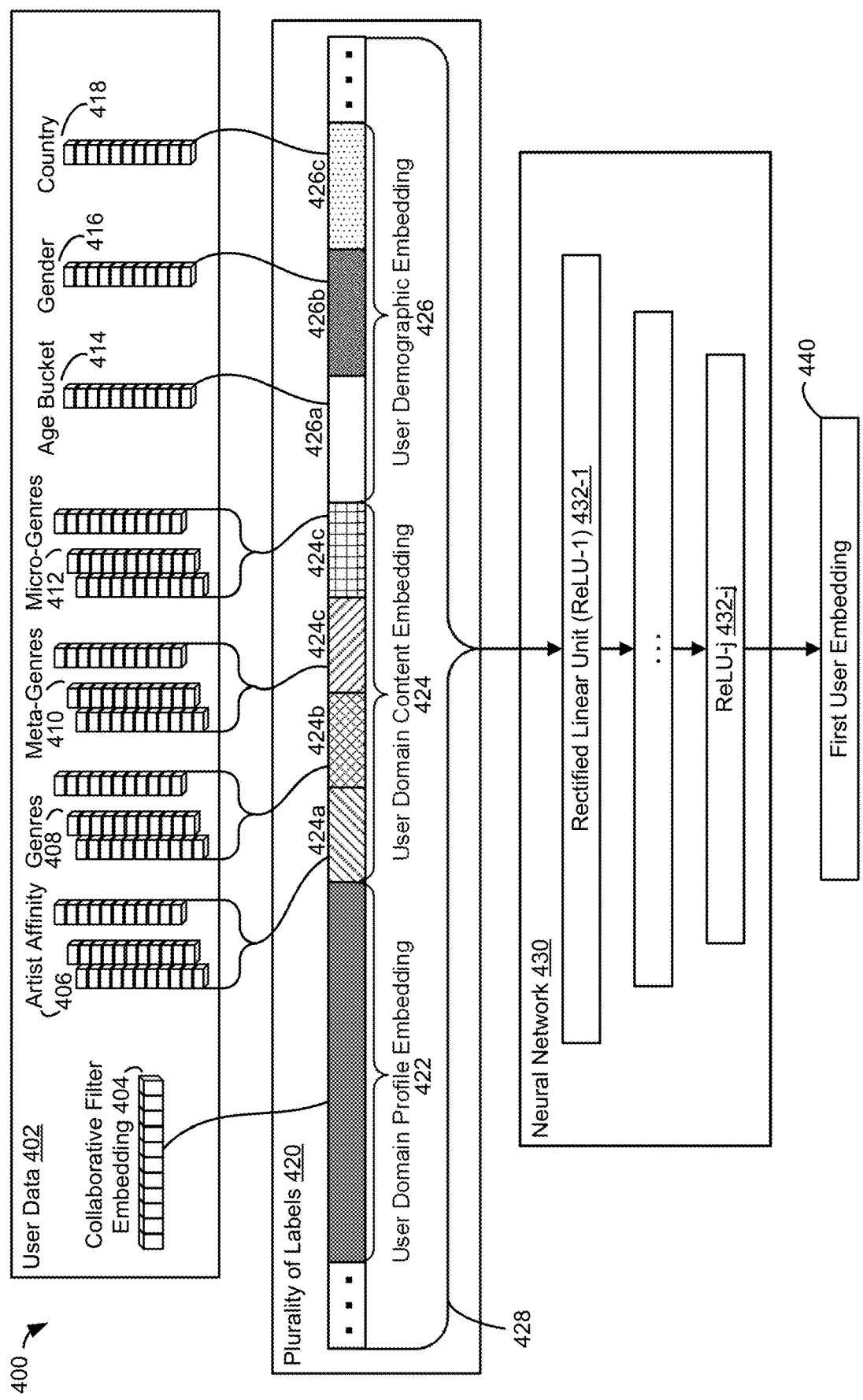
FIG. 4 illustrates the generation of user embedding for a content domain in accordance with some embodiments.

FIG. 4 illustrates a user embedding system 400 of media content server 108, in accordance with some embodiments. In some embodiments, system 400 generates a user embedding by using user data 402 to generate a plurality of labels 420 and processing the plurality of labels using a neural network 430. An embedding is a mapping of discrete variables to a vector of continuous numbers. User embeddings that correspond to consumption of media in a particular content domain (e.g., music) are used to determine media from a second and/or target content domain (e.g., podcasts) to recommend and/or provide to a user.

In some embodiments, user data 402 includes an embedding for a user of the media-providing service. For example, in FIG. 4, user data 402 includes collaborative filtering embeddings 404, user metadata embeddings (e.g. artist affinity 406, genre 408, meta-genre 410, micro-genre 412, etc.), user demographic embeddings (e.g. age bucket 414, gender, 416, country 418, etc.), and/or other embeddings for a particular content domain. In some embodiments, collaborative filtering embeddings 404 are obtained via collaborative transfer. In some embodiments, collaborative transfer includes performing collaborative filtering on media consumption history of users of the media-providing service for a particular content domain (e.g., a content domain such as a music domain). Collaborative filtering is performed to group media content items based on similarity (e.g., using the context in which the content items are consumed). For example, collaborative filtering creates associations between media content items that are consumed by similar users in similar situations.

In some embodiments, collaborative filtering is used to provide a media content item to a user based on the previously consumed media content items of multiple users of the media-providing service. For example, collaborative filtering utilizes the obtained media consumption history 104 associated with a particular domain (e.g., music domain) to generate collaborative filtering embeddings to predict a media content item a user would prefer in various contexts (e.g., at a library, on their commute; at work; at home; when socializing with friends, family, and/or co-workers; based on their feelings and/or moods; at events and/or special occasions; performing specific tasks and/or hobbies) and/or depending the type of client device used (e.g. portable speakers, phones, television, etc.)). For instance, in some embodiments, the collaborative filtering embeddings for the music domain are based on media consumption history 104 that includes music history (e.g., 110-1). In some embodiments, music history (e.g., 110-1) includes user created playlists, user consumed, favorited content items, and/or other information described above in user data module 224 and media account database 334 of FIGS. 2 and 3, respectively. In some embodiments, collaborative filtering includes utilizing word embeddings (generated by models such as word2vec) for a content domain (e.g. the music domain) and playlist co-occurrence information for the content domain to generate a dense embedding for each media content item in the content domain that a user has consumed. The dense embeddings are further used to determine a user's embeddings as an average over all media content items they have consumed.

In some embodiments, user data 402 includes metadata for a content domain (e.g., the music domain). The content domain metadata includes information corresponding to artist/artist affinity 406, genre 408, meta-genre 410, micro-genre 412, etc. that can be utilized to generate respective embeddings. For example, artist/artist affinity 406, genre 408, meta-genre 410, and micro-genre 412 metadata for the music domain are utilized to generate respective artist/artist affinity, genre, meta-genre, and micro-genre embeddings for a user (e.g., embeddings generated for client device 102-1 based on consumed media in music history 110-1). Meta-genre is a high-level domain category. For example, music meta-genre can include "folk," "rap," and/or any other types of music definitions. Genre includes more specific types of domain categories. For example, music genres can include "blues," "hip hop," and/or any other types of music definitions. Micro-genre is a granular definition of the domain category. For example, in music micro-genre can include "Texas blues," "East coast hip hop," and/or any other types of music definitions.

In some embodiments, the metadata information is sparse (e.g., limited with respect to the total available information to generate embeddings). For instance, the total number of artists, genres, meta-genres, micro-genres, etc. in the music domain are limited in comparison to the total number of songs. The sparse metadata information enables the user embedding system 400 to generate metadata embeddings (e.g. 424a through 424c) for a user at the same time that neural network is trained and/or while the neural network is trained. Thus, the sparse metadata information enables the user embedding system 400 to generate metadata embeddings efficiently in comparison to the other embeddings such as the collaborative filter embedding 404.

In some embodiments, the metadata information for artist affinity 406, genre 408, meta-genre 410, and/or micro-genre 412 include two or more similar and/or identical embeddings. For example, client device 102-1 includes media consumption history 104 and music history 110-1. In some embodiments, music history 110-1 includes a number of songs consumed by client device 102-1 that are created by the same artist and/or are within the same genre. In some embodiments, the two or more similar and/or identical metadata information are averaged to generate a single distinct embeddings. For example, as illustrated in FIG. 4, artist affinity 406, genre 408, meta-genre 410, and/or micro-genre 412 include a plurality of embeddings, the plurality of embeddings are averaged to generate single metadata characteristics 424a, 424b, 424c, and 424c, that correspond to artist affinity 406, genre 408, meta-genre 410, and/or micro-genre 412 respectively. In some embodiments, the average of the two or more embeddings (e.g. single metadata characteristics 424a, 424b, 424c, and 424c) are formed into fixed-width embeddings suitable for input to the neural network.

In some embodiments, user data 402 includes user demographic information (e.g., age bucket 414, gender 416, country 418, etc.). The user demographic information is utilized to generate a demographic embedding for a user of a client device 102 (e.g., client device 102-1 associated with a first user). For example, age bucket 414, gender 416, and country 418 of a user's demographic information are utilized to generate an age 426a, gender 426b, and/or country 426c embedding for the user. In some embodiments, the demographic information is sparse. Similar to sparse metadata information, sparse demographic information is limited by the total amount of information. For example, a user's age is limited to a particular number or range (e.g. 18-25 years old), gender is limited to the user's identification, and country is limited to a current location or particular location selected by the user. In some embodiments, the sparse demographic information enables the user embedding system 400 to generate embeddings for age 414, gender 416, and country 418, for a user at the same time that neural network is trained and/or while the neural network is trained. In some embodiments, the demographic information embeddings (e.g., age 426a, gender 426b, and/or country 426c) are fixed-width embeddings suitable for input to the neural network. Although the FIG. 4 illustrates age bucket 414, gender 416, and country 418, it should be noted that embeddings can be created for additional demographic information not shown.

In some embodiments, a plurality of labels 420 are identified by the user embedding system 400 from the obtained user data 402. In some embodiments, the user data 402 is obtained from user data module 224 and/or media account database 336 as described above in FIG. 2 and FIG. 3, respectively. In some embodiments, the plurality of labels are identified at the same time that one or more embeddings are generated. For example, sparse information, such as metadata and demographic information, is used to generate embeddings at the same time that the plurality of labels are identified. In some embodiments, embeddings are generated before the plurality of labels are identified. For example, the collaborative filter embedding 404 is generated before the plurality of labels are identified and/or the neural network is trained.

In some embodiments, the plurality of labels 420 for a user include at least two labels, each label of the plurality of labels is distinct, and each label of the plurality of labels has a same width. For example, a label for user domain profile embedding 422 and a label for user demographic embedding 426 are included in the plurality of labels 420 and the labels are the same width. In some embodiments, the plurality of labels may include user domain profile embedding 422, user domain content embedding 424, and user demographic embedding 426. For example, the identified plurality of labels in FIG. 4 include the user domain profile embedding 422, user domain content embedding 424, and user demographic embedding 426.

In some embodiments, individual labels (e.g., user domain profile embedding 422, user domain content embedding 424, and user demographic embedding 426) of the plurality of labels corresponds to distinct characteristics of the user data. For example, as described above with respect to the demographic information embeddings 426 (e.g., age 426*a*, gender 426*b*, and/or country 426*c*) and the metadata embeddings (characteristics 424*a*, 424*b*, 424*c*, and 424*c*, that correspond to artist affinity 406, genre 408, meta-genre 410, and/or micro-genre 412 respectively) include distinct characteristics. In some embodiments, the distinct characteristics are fixed-width embeddings and together form a label of equal width as the plurality of labels. For example, demographic information embeddings 426 includes distinct characteristics for age 426*a*, gender 426*b*, and/or country 426*c* and is the same width as user domain profile embedding 422.

In some embodiments, one or more labels of the plurality of labels are concatenated, as shown by the concatenated set of labels 428. For example, user domain profile embedding 422, user domain content embedding 424, and user demographic embedding 426 are concatenated into concatenated set 428.

In some embodiments, the plurality of labels 420 are utilized by a neural network 430 to generate a first user embedding 440 based on user data 402 for a particular content domain (e.g. first user embedding for client device 102-1 associated with the first user). For instance, embeddings are generated for client devices 102 that have consumed media content in the music domain. The embeddings are based on the user data 402 in the music domain. The first user embedding 440 is used to characterize a client device 102 user's preference in the particular content domain (e.g. music domain).

In some embodiments, the neural network 430 includes an input layer (e.g., the plurality of labels 420), an output layer (e.g. a plurality of user embeddings including the first user embedding 440), and at least one Rectified Linear Unit (ReLU) layer 432, the at least one ReLU layer positioned between the input layer and the output layer. In some embodiments, the neural network 430 is fully-connected (e.g., the neurons of any two adjacent layers are connected pairwise). Additional ReLU layers (e.g. ReLU layer 432-1 through j ReLU layer 432-*j*, where j is an integer greater than 1) are positioned between the input layer and the output layer. The ReLU layers 432 are utilized to merge the plurality of labels 420 into the embedding for the user (e.g. first user embedding 440). In some embodiments, the at least one ReLU layer 432 and each additional ReLU layer (e.g., ReLU layer 432-*j*) are distinct in width and/or depth. The ReLU layers 432 perform activation functions (e.g., functions that define the output given an input or set of inputs). In some embodiments, the ReLU layers 432 are used to merge the labels of plurality of labels 420 for the user into the first user embedding 440 (e.g., the output embedding). In some embodiments, the performance of the neural network improves as the number of ReLU layers 432 increases.

In some embodiments, the media content server 108 utilizes user embeddings generated by user embedding system 400 to determine media content items in an unconsumed content domain for a user of client device 102 that meet matching criteria for the user. For example, a user embedding generated for a user based on the user's consumption of media content items in the music domain is used to determine media content items in an unconsumed domain (e.g. a target domain such as podcast) that match the user's interests. The generated first user embedding 440 closely matches the dimensions of a media content item embedding for a target domain (e.g., as illustrated and discussed in FIG. 5).

Figure 5:
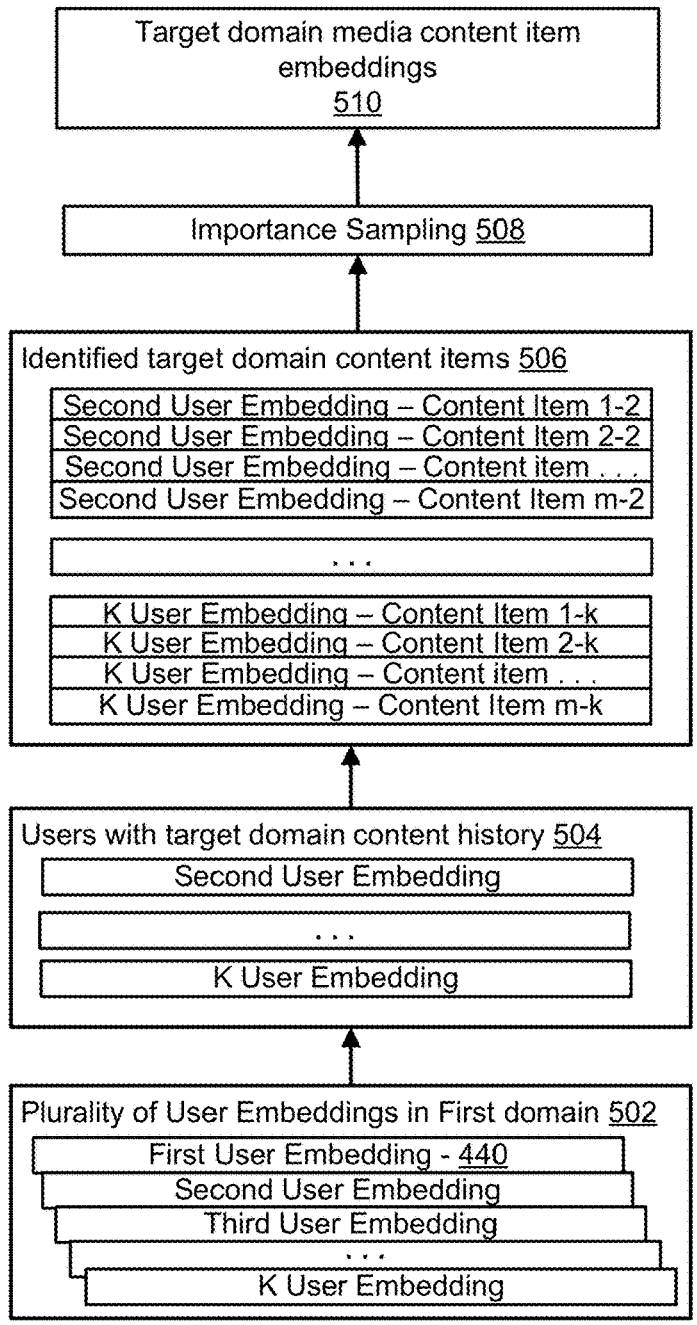
FIG. 5 illustrates the generation of embeddings for media content items of a target domain in accordance with some embodiments.

FIG. 5 illustrates a target domain media content item embedding system 500 of media content server 108 in accordance with some embodiments. In some embodiments, target domain media content item embeddings (e.g. target domain media content item embedding 510) are generated by the same and/or a similar process described to generate user embeddings as described above in FIG. 4. For example, the plurality of user embeddings in the first domain 502 (including first user embedding 440) are embeddings generated by user embedding system 400 using media content items in a particular domain (e.g., the music domain). For instance, user embeddings are generated for client devices 102 (e.g., client device 102-1 through client device 102-*k*) that have media consumption history 104 that includes music history. The user embeddings are generated utilizing user data 402 for the music domain (e.g. obtained from user data module 224 and/or media account database 334 of FIGS. 2 and 3, respectively).

In some embodiments, the plurality of user embeddings for a particular domain are utilized to generate media content item embeddings for media content items of an unconsumed content domain. For example, client device 102-2 includes media consumption history 104-2 that includes music history 110-2 and podcast history 110-3. A user embedding is generated for client device 102-2 using user embedding system 400 and based on user data 402 for the music domain (e.g., utilizing music history 110-2, specifically, the user data in the music domain obtained from user data module 224 and media account database 334 of FIGS. 2 and 3, respectively). The user embedding (e.g., based on the user data for the music domain) for client device 102-2 is used to generate embeddings for media content items included in client device's 102-2 podcast history 110-3, as discussed below.

In some embodiments, client devices 102 that have consumed media content in a target domain are identified (e.g., users with target domain content history 504) based on their listening history (e.g., media consumption history 104). For example, client devices 102 that have consumed podcasts (e.g., have podcast history 110) are identified and used to determine which media content items in the podcast domain (e.g., target domain) to provide client device 102-1 that has yet to consume any podcasts on the media-providing service. In some embodiments, the identified users with target domain content history 504 have one common domain with the user of the client device being provided the media content items in the target domain. For example, client devices 102 that have been identified to have podcast history 110 also include music history 110. The common domain (e.g., the music domain) is used along with podcast histories of the client devices 102 to determine which media content items in the podcast domain (e.g., target domain) to provide client device 102-1. For instance, client device 102-2 includes media consumption history 104-2 and includes music history 110-2 and podcast history 110-3. A user embedding generated for client device 102-2 that is based on user data for the music domain is used to determine podcasts in client device's 102 podcast history 110-3 to provide to client device 102-1.

In some embodiments, media content items in the target domain (e.g., podcast domain) for the client devices 102 are identified 506. Embeddings for the media content items identified in the target domain 506 are generated by replicating the user embeddings of the client devices 102 user embedding in the first domain (e.g., music domain). For example, client device 102-2 and client device 102-k include music history (110-2 and 110-6 respectively) and podcast history (110-3 and 110-7) and are used to determine which podcasts to provide client device 102-1 which has not yet consumed podcast on the media-providing service. User embeddings are generated for client device 102-1, client device 102-2, and 102-k based on user data in a first content domain (e.g. the music domain) and using the user embedding system 400 of media content server 108, as discussed above. Embeddings are generated for the media content items in the podcast history (110-3 and 110-7) for client devices 102-2 and 102-k by replicating (e.g., copying) the user embeddings in the music domain generated for client device 102-2 and 102-k. For example, as illustrated in FIG. 5, the identified target domain content items 506 include media content items 1-2, 2-2 . . . m-2 that have been consumed by client device 102-2 and media content items 1-k, 2-k . . . m-k that have been consumed by client device 102-k. The individual content items are represented as embeddings and the embeddings are reproduced (or replicated) from the client devices' user embedding in the first content domain (e.g., music domain) instead of the target domain (e.g. podcasts).

In some embodiments, media content items of the target domain (e.g. podcasts) exclude media information corresponding to the media content item of the target domain and/or the target domain. For example, embeddings for media content items 1-2, 2-2 . . . m-2 and 1-k, 2-k . . . m-k are replicated (or copied) embeddings of the client devices' user embedding for the first content domain (e.g. music domain). As such, media content items 1-2, 2-2 . . . m-2 and 1-k, 2-k . . . m-k include user specific information about the first content domain (e.g. music domain) without including information about the content item itself or the target domain (e.g. podcasts). In this way, client devices 102 that have not consumed media content items in a particular domain are provided media content items that meet matching criteria based on their known interest in a media content domain that has been consumed. For example, client device's 102-1 user embedding in the music domain is compared with client device's 102-2 embeddings for consumed media content items in the podcast domain, where the embeddings for consumed media content items are replicated (e.g., copied) from client device's 102-2 user embedding in the music domain.

In some embodiments, importance sampling 508 (e.g. negative sampling) is performed on the identified target domain content item 506. Importance sampling 508 is utilized to enable the model to efficiently converge. Importance sampling decreases the total convergence time by assigning weighted values to labels and/or specific attributes of a user embedding (e.g., of the plurality of user embeddings in the first domain 502). The specific labels and/or attributes are discussed above in FIG. 4. In some embodiments, importance sampling is performed on the identified target domain content items 506 before compared with a user embedding. For example, importance sampling 508 is performed on second user embedding for content item 1-2 before it is compared with user embedding (e.g. 440; FIG. 4) for client device 102-1 to determine whether matching criteria is met. In some embodiments, the target domain includes a large number of classes (e.g. the space of all possible media content items in the target domain) and importance sampling reduces the total amount of processing required.

In some embodiments, importance sampling 508 of the identified target domain content items 506 generates target domain media content item embeddings 510. In some embodiments, the target domain media content item embeddings 510 are used to compare user embeddings in a content domain other than the target domain to determine whether matching criteria is met. For example, client device 102-2 includes an embedding for content item 1-2 of a target domain (e.g. podcast). The embedding for content item 1-2 is generated by replicating a user embedding for client device 102 in the first content domain (e.g., music domain). Importance sampling of the embedding for content item 1-2 assigns weighted values to labels and/or specific attributes of the user embedding for client device 102 such that the target domain media content item embedding 510 is generated efficiently. The target domain media content item embedding 510 is compared with a user embedding for a distinct client device (e.g., 102-1) to determine whether matching criteria are met.

Figure 6:
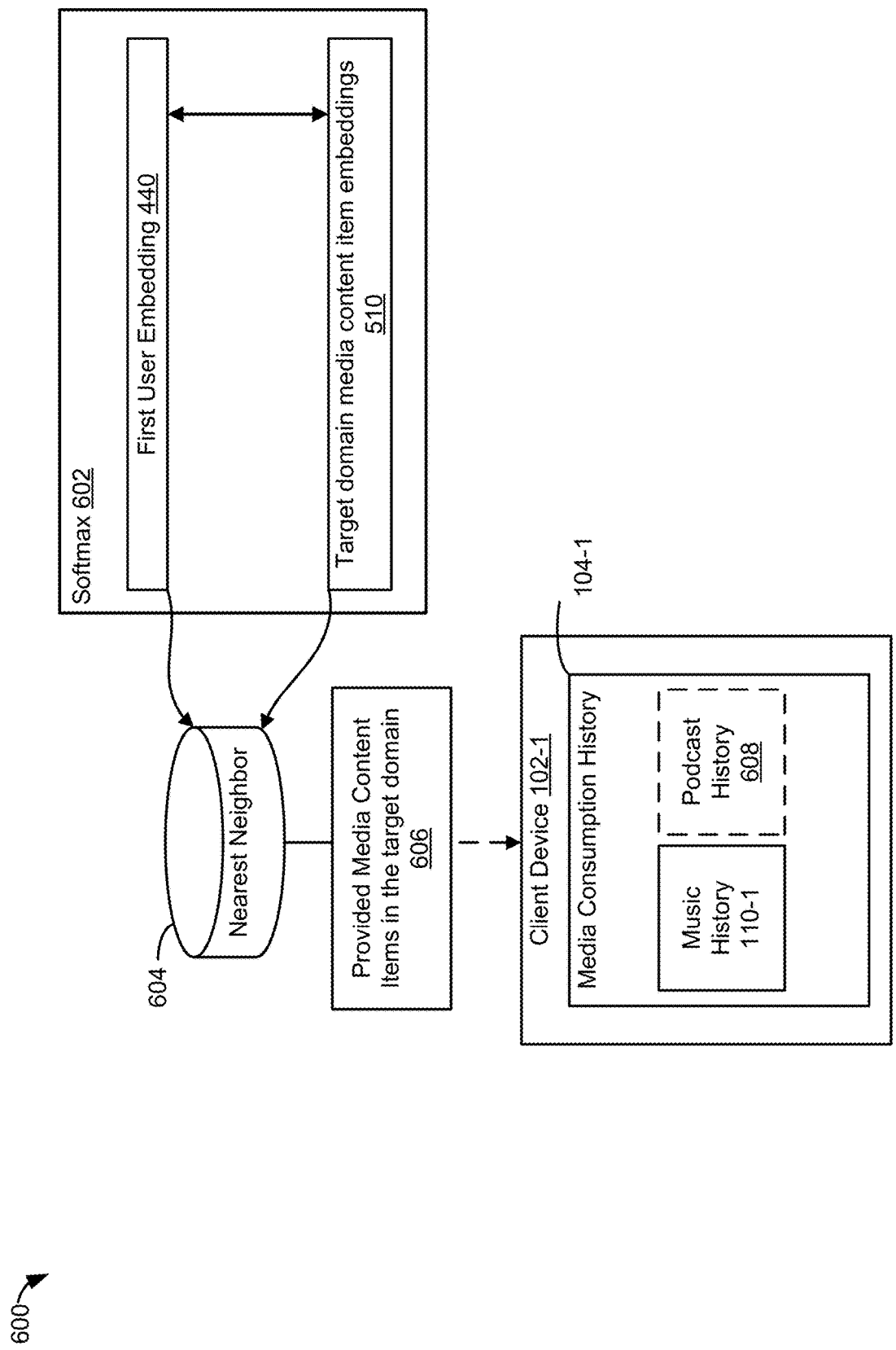
FIG. 6 illustrate a media-providing system in accordance with some embodiments.

FIG. 6 illustrates a media-providing system 600 in accordance with some embodiments. In some embodiments, a client device 102 is provided a media content item in a content domain the client device 102 has not consumed within the media-providing service based on the media consumption of other client devices. For example, client device 102-1 is provided media content items in the podcast domain based on the podcast consumption of other client devices (e.g., 102-2 through 102-k). In some embodiments, a softmax classifier 602 is used to minimize the cross-entropy loss between a user's embedding that is generated based on the user data 402 for a content domain (e.g. first user embedding 440 for a particular client device 102) and a target domain media content item embedding 510 (e.g., the cross-entropy loss between the negative samples and the true label (i.e., actual value)). The softmax classifier 602 provides a measurement of how well the media-providing system 600 is performing at a given time in the training. The softmax classifier 602 is operated continuously throughout the process and provides an indication of the relationship between the first user embedding 440 and the target domain media content item embedding 510 (e.g. how closely related the two embeddings are to one another). In some embodiments, the softmax classifier 602 is used to determine optimal cross-entropy loss before providing a media content information.

In some embodiments, the softmax classifier 602 is utilized to determine the performance of the neural network at predetermined intervals. For example, the softmax classifier 602 is utilized to determine the cross-entropy loss for every target domain media content item embedding 510, every other target domain media content item embedding 510, every fifth target domain media content item embedding 510, etc.).

In some embodiments, a client device 102 of a user is provided media content information corresponding to one or more target domain media content item embeddings 510 that meet matching criteria for the first user. Meeting matching criteria includes determining a matching criteria value for content items of the second content domain and determining whether the matching criteria value meets a predetermined threshold. For example, user embedding for client device 102-1 is compared with target domain media content item embedding 510, where target domain media content item embedding 510 is determined based on the identified target domain content items 506 as discussed above in FIG. 5. In some embodiments, the matching criteria for the first user includes criteria that are met in accordance with a determination that a target domain media content item embedding 510 that is closely related to the first user embedding 440. The target domain media content item embedding 510 is determined to be closely related based on similarities between the first user embedding 440 and target domain media content item embedding 510.

In some embodiments, meeting matching criteria includes performing a nearest neighbor analysis 604 between the first user embedding 440 and the target domain media content item embeddings 510. Nearest neighbor analysis 604 is a non-parametric method used for classification and regression of data distributions. In other words, neighbor analysis 604 is way to determine a classification of an item based on the available data or estimating a relationships among the content items based on the data available. In some embodiments, the nearest neighbor analysis 604 is performed between target domain media content item embeddings 510 and the first user embedding 440 for a particular client device (e.g. 102-1). In some embodiments, the target domain media content item embedding 510 that is the most closely related (e.g. the nearest neighbor) to the first user embedding is provided to the user of the client device (e.g., 102-1) as a media content item of the target domain 606 that matches the interest of the user of the client device (e.g. 102-1). In some embodiments, the provided media content items in the target domain 606 include media content item information. In some embodiments, the nearest neighbor analysis 604 is performed between the first user embedding 440 and at least two target domain media content item embedding 510 (e.g., content item 1-2 and content item 2-2) and the most closely related (e.g., nearest neighbor) target domain media content item embedding 510 of the at least two embeddings to the first user embedding 440 is provided to the user of the client device (e.g. 102-1).

In some embodiments, the nearest neighbor analysis includes ranking target domain media content item embeddings 510. In some embodiments, a matching criteria value is determined for a set of content items of the target content domain 606 and content items of the target content domain 606 are ranked based on the matching criteria values. In some embodiments, the rankings of the target domain media content item embedding 510 are based on the mostly highly ranked media content item (e.g. media content item that is the most similar to the first user embedding and/or has the greatest determined threshold). In some embodiments, the ranked target domain media content item embeddings 510 are provided to the first user in descending order from the most highly ranked (e.g. most related media content item to the first user embedding) to the lowest ranked (e.g. little to no relation between a media content item and the first user embedding).

In some embodiments, the provided media content items in the target domain 606 are incorporated into the media consumption history 104 of the particular user (e.g. client device 102-2). For example, client device 102-1, associated with a first user, is provided media content items in the target domain 606 and the provided media content items in the target domain 606 are incorporated into client device's 102-1 media consumption history 104-1. For instance, as illustrated in FIG. 6, client device 102-1 included media consumption history 104-1 that included music history 110-1 and no additional content history. The provided media content items in the target domain 606 (podcast domain) are incorporated into client device's 102-1 media consumption history 104-1 and create podcast history 608. In some embodiments, after the first user of client device 102-1 consumes media content items in an unconsumed domain (e.g., podcasts domain) the subsequent provided media content items in the same unconsumed domain (e.g., podcasts domain) change from cold start recommendations (recommendations based on no information corresponding to the target domain) to warm start recommendations (recommendations based on a minimal information corresponding to the target domain).

In some embodiments, a user of client device 102 provides, via user input device 208 of the client device 102, an indication of a response to the provided media content item in the target domain 606. In some embodiments, the indication of the response is stored by media consumption history 104 (e.g., in association with identifying information for the provided media content item). In some embodiments, the indication of the response to the provided media content item in the target domain 606 includes playback of the provided media content item; a subscription corresponding to the recommended media content item; a purchase corresponding to the provided media content item; completion of the provided media content item; creating, sharing, and/or following a playlist corresponding to the provided media content item; and/or feedback for the provided media content item.

Figure 7B:
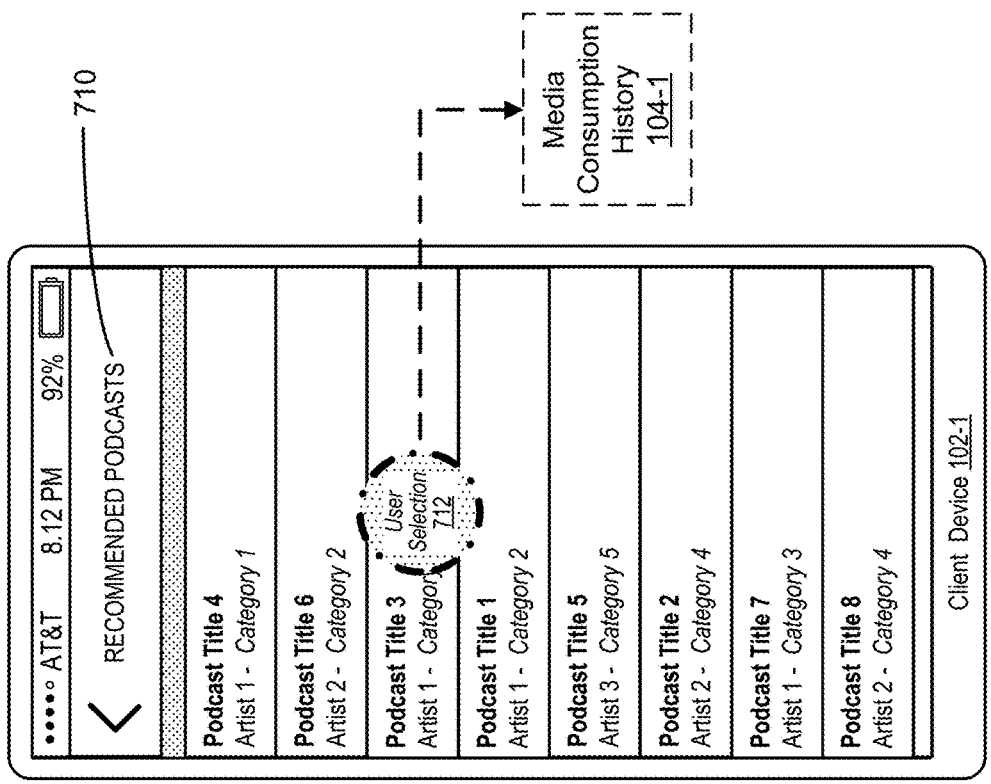
FIGS. 7A-7B illustrate user interfaces associated with the media-providing service in accordance with some embodiments.
Figure 7A:
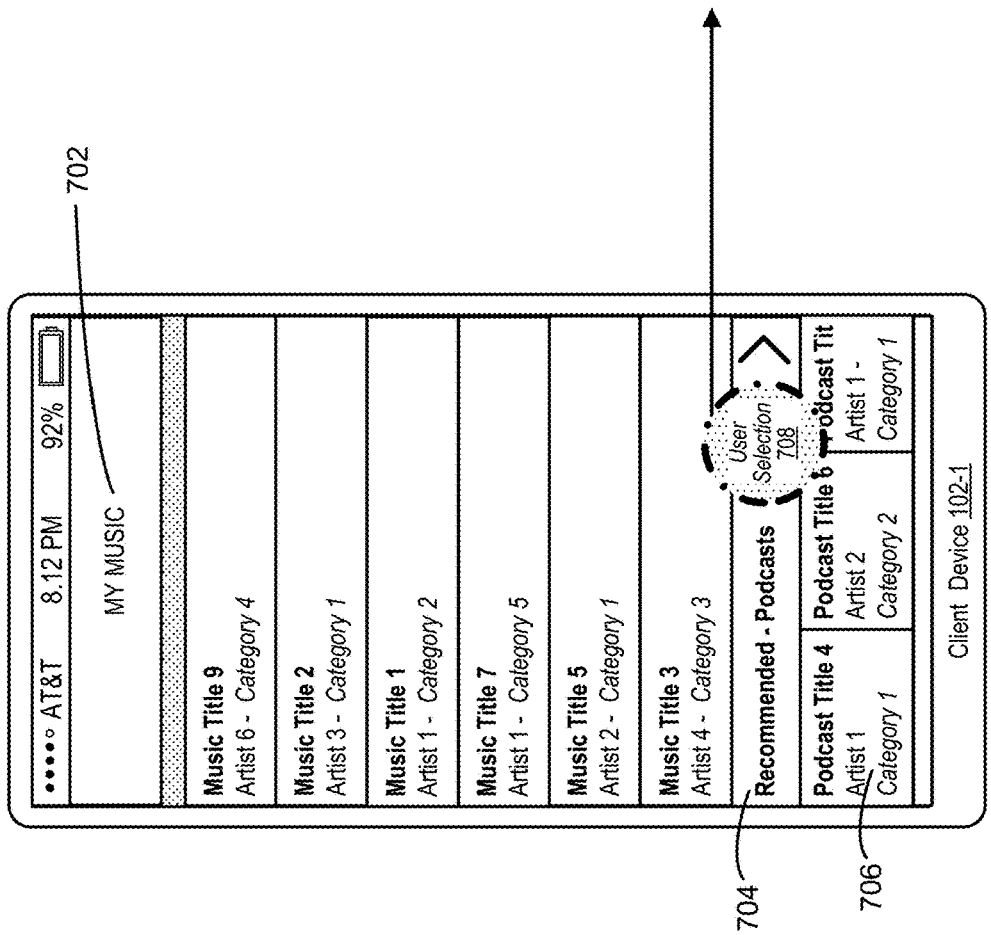
Figure 8A:
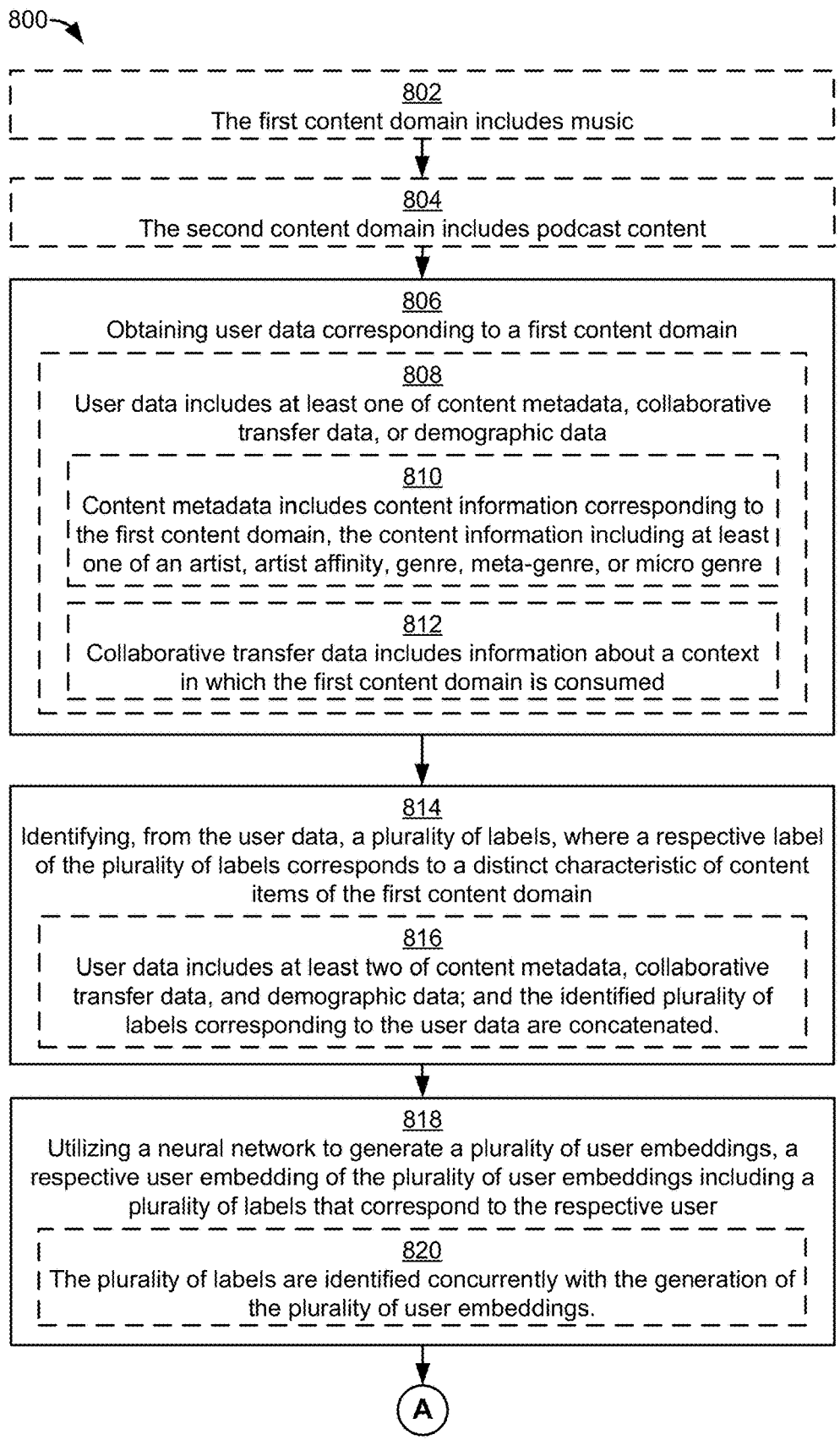
Figure 8B:
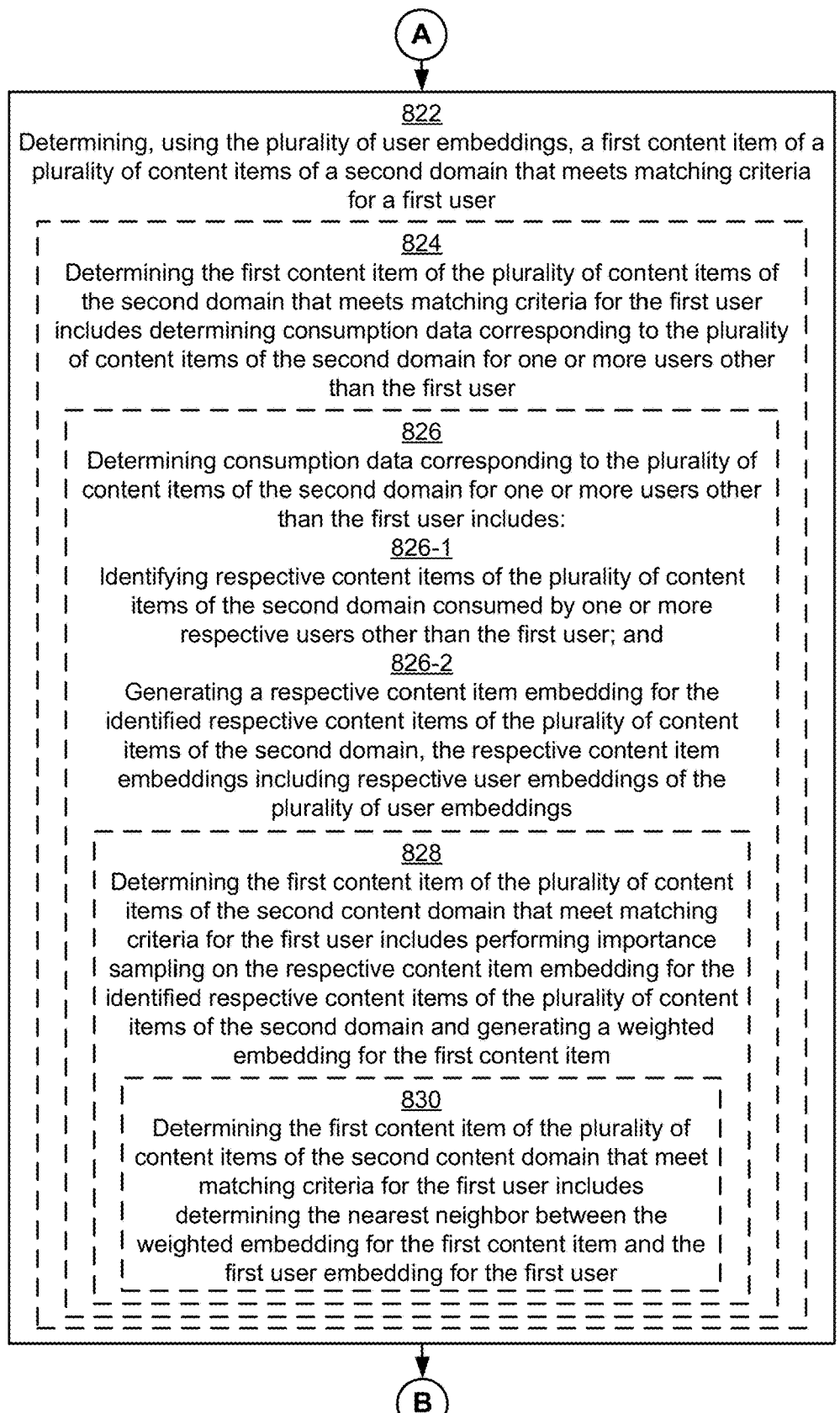
Figure 8C:
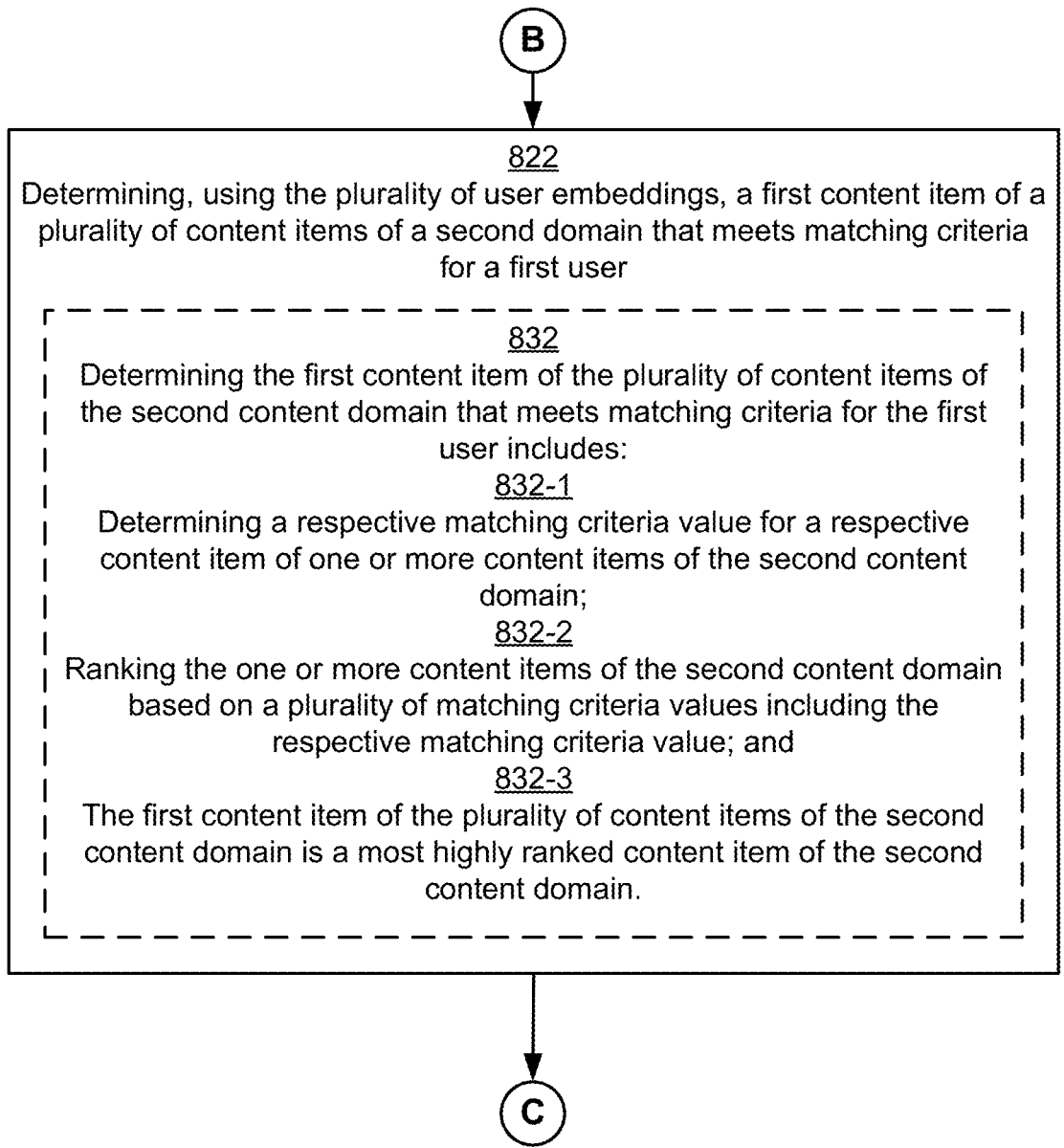

FIGS. 7A and 7B illustrate user interfaces associated with the media-providing service in accordance with some embodiments. In FIG. 7A, client device 102-1 displays a user interface for the media-providing service. In some embodiments, the media-providing service provides media content in multiple domains (e.g., music, podcasts, audio books, comedy, etc.). In some embodiments, a user of client device 102-1 has media consumption history 104 that does not include media content from a particular domain (e.g., the user has not previously received and/or consumed podcasts from the media-providing service). As indicated in FIG. 7A, the user interface displayed by client device 102-1 includes "My Music" 702 that indicates a list of at least a portion of the music items that the user of client device 102 has received from the media-providing service. In some embodiments, the media-providing service provides indications to a user of media content items in a second domain to the user of client device 102. For example, the user interface displayed by client device 102-1 includes a "Recommended Podcasts" 704 control and one or more podcasts 706, such as "Podcast Title 4." In some embodiments, user selection 708 of the "Recommended Podcasts" 704 control, causes content items from the second media content domain (e.g., podcasts) to be displayed by client device 102-1 (e.g., as indicated at FIG. 7B).

FIG. 7B illustrates a user interface displayed by client device 102-1 that includes a list of at least a portion of one or more indications of media content items from the target domain (e.g., podcasts). In some embodiments, the indications of content items from the second domain are ranked and are ordered by ranking in the user interface. In some embodiments, the rankings are based on the nearest neighbor analysis between a first user embedding 440 for the first content domain (e.g., music) and target domain media content item embeddings 510.

In some embodiments, information corresponding to media content items in the target domain provided to a client device 102 are stored in media consumption history 104. For example, FIG. 7B illustrates client device 102-1 that includes media consumption history 104-1 and media consumption history 104-1 includes music history 110-1. Client device 102-1 is provided media content items in the target domain 606 as discussed above and, based on those provided media content items in the target domain 606, client device 102-1 receives, via a user, an indication of a response to the one or more media content items in the target domain 606. In some embodiments, the indication of a response to the one or more media content items in the target domain 606 incorporates the media content items in the target domain 606 into the music consumption history 104-1 of client device 102-1. For example, "Podcast Title 3" is incorporated into media consumption history 104-1 in response to user input 712 at a location that corresponds to of the media content item "Podcast Title 3," for selection (playback) of "Podcast Title 3."

FIGS. 8A-8D are flow diagrams illustrating a method 800 of providing information that corresponds to a content item, in accordance with some implementations. In some embodiments, method 800 is performed by server 108 (e.g., media content server 108, FIGS. 1 and 3). Alternatively and/or additionally, in some embodiments, method 800 is performed by an electronic device 102 (e.g., client device 102-1 through client device 102-k, FIGS. 1 and 2). Operations performed in FIG. 8 correspond to instructions stored in computer memory (e.g., memory 212 of client devices 102, FIG. 2, and/or memory 306 of media content server 108, FIG. 3).

The server 108 obtains (806) user data (e.g., as illustrated at 402, FIG. 4) corresponding to a first content domain. For example, server 108 obtains user data from electronic device 102-1 via one or more networks 112 and/or from stored user data on the server memory 306 (e.g., user information data module 336). In some embodiments, the first content domain includes (802) music. In some embodiments, the user data includes (808) at least one of content metadata, collaborative transfer data, or demographic data. In some embodiments, the content metadata includes (810) content information corresponding to the first content domain, the content information including at least one of an artist, artist affinity, genre, meta-genre, or micro genre. In some embodiments, the collaborative transfer data includes (812) information about a context in which the first content domain is consumed. Examples for the context in which the first content domain is consumed are provided above, such as, where, when, what kind, with whom, and/or how a user would consume the media content in the first content domain.

The server 108 identifies (814), from the user data (e.g., as illustrated at 402), a plurality of labels (e.g., as illustrated at 420), where a respective label of the plurality of labels corresponds to a distinct characteristic of content items of the first content domain. In some embodiments, the user data includes (816) at least two of content metadata, collaborative transfer data, and demographic data and the identified plurality of labels corresponding to the user data are concatenated into concatenated set 428. For example, FIG. 4 illustrates a plurality of labels 420 with identified labels (user first domain profile embedding 422, user first domain content embedding 424, and user demographic embedding 426) concatenated into concatenated set 428.

The server 108 utilizes (818) a neural network 430 to generate a plurality of user embeddings (e.g., as illustrated at first user embedding 440; FIG. 4), a respective user embedding of the plurality of user embeddings including a plurality of labels that correspond to the respective user. In some embodiments, the plurality of labels (e.g., as illustrated at 420) are identified (820) concurrently with the generation of the plurality of user embeddings. For example, as described above, sparse information such as demographic and/or content metadata can be generated at the same time that the neural network is trained.

The server 108 determines (822), using the plurality of user embeddings (e.g., first user embedding, second user embedding, third user embedding, K user embedding), a first content item (e.g., as illustrated by target domain media content item embedding 510; FIG. 5 and FIG. 6) of a plurality of content items of a second domain that meets matching criteria for a first user. In some embodiments, the second content domain includes (804) podcast content (e.g., as illustrated by identified target domain content items 506). In some embodiments, determining (824) the first content item (e.g., target domain media content item embedding 510) of the plurality of content items of the second domain that meets matching criteria for the first user includes determining consumption data corresponding to the plurality of content items of the second domain for one or more users other than the first user (e.g. identified target domain content items 506 such as second user embedding 1-2, 2-2 . . . m-2 through K user embedding 1-k, 2-k, . . . m-k). For example, as shown in FIG. 1, the one or more electronic devices 102 include media consumption history 104 which includes one or more domains, where at least one of the one or more domains of media consumption history 104 for distinct electronic devices 102 is similar across the distinct electronic devices 102 (e.g., illustrate by client devices 102-1 through client device 102-k have media consumption history that include music history 110).

In some embodiments, determining (826) consumption data corresponding to the plurality of content items of the second domain for one or more users other than the first user includes identifying (826-1) respective content items of the plurality of content items of the second domain consumed by one or more respective users other than the first user (e.g., as illustrated by identified target domain content items 506), and generating (826-2) a respective content item embedding for the identified respective content items of the plurality of content items of the second domain (e.g., as illustrated by second user embedding 1-2, 2-2 . . . m-2 through K user embedding 1-k, 2-k, . . . m-k of identified target domain content items 506), the respective content item embeddings including respective user embeddings of the plurality of user embeddings. For instance, if a second user (e.g., a user of client device 102-2) listened to media content items in a second domain (e.g., second user listened to six podcasts), each podcast would be processed individually to generate podcast specific embeddings, the podcast specific embeddings' are determine based on the second user's embedding for the first content domain (e.g., music). The process described above is performed for each user and each content item in the target domain that the users have consumed (e.g., as illustrated by identified target domain content items 506).

In some implementations, determining (828) the first content item 510 of the plurality of content items in the second content domain that meets matching criteria for the first user includes performing importance sampling 508 on the respective content item embedding for the identified respective content items 506 of the plurality of content items of the second domain and generating a weighted embedding for the first content item (e.g. as illustrated by 510). For example, an individual podcast embedding (e.g., second user embedding—content item 1-2 of the identified target domain content items 506) is determined based on a music embedding for client device 102 associated with a second user (e.g. client device 102-2) and the individual podcast is importance sampled 508 to generate weighted values for the embedding, the weighted values enable the model to converge in an efficiently.

In some embodiments, determining (830) the first content item of the plurality of content items of the second content domain that meets the matching criteria for the first user includes determining the nearest neighbor 604 between the weighted embedding for the first content item (e.g., 2nd domain media content Item embeddings 510) and the first user embedding for the first user 440 (e.g., as illustrated in FIG. 6).

In some embodiments, determining (832) the first content item of the plurality of content items of the second content domain that meets matching criteria for the first user includes determining (832-1) a respective matching criteria value for a respective content item of one or more content items of the second content domain and ranking (832-2) the one or more content items of the second content domain based on a plurality of matching criteria values including the respective matching criteria value. In some embodiments, the first content item of the plurality of content items of the second content domain is a most highly ranked (832-3) content item of the second content domain. For example, each media content item in the second domain (e.g. podcast) is matched with a first user's embedding for the first content domain (e.g., music), each media content item in the second domain is determined to have a matching value (e.g., a score and/or probability of similarity), each media content item in the second domain is ranked, and the highest ranked media content item in the second domain is provided to the user.

The server 108 provides (834) to a device of the first user, information that corresponds to the first content item of the plurality of content items of the second content domain (e.g., as illustrated by recommended podcast 710; FIG. 7B). In some embodiments, the server provides (836), to the device of the first user, information corresponding to the one or more ranked content items of the second content domain in descending order based on rank. In some embodiments, the provided information corresponding to the first content item of the plurality of content items of the second content domain is incorporated (838) into the user data corresponding to the first user (e.g., as illustrated by the generation of Podcast History 608 of media consumption history 104-1). In this way, a user that had not consumed media content in the second domain is introduced to new content and the new content is used for future recommendations (e.g., the recommendation system transitions from a cold start recommendation to a warm start recommendation).

In some embodiments, prior to incorporating (840) the provided information corresponding to the first content item of the plurality of content items of the second content domain into the user data corresponding to the first user, the server receives (840-1), from a device of the first user, an indication of a response to the first content item of the plurality of content items of the second content domain (e.g., as illustrated by user selection 712; FIG. 7B). The indication of the response includes (840-2), in the provided information corresponding to the first content item of the plurality of content items of the second content domain, the indication of the response to the first content item of the plurality of content items of the second content domain. In some embodiments, the indication of the response to the first content item of the plurality of content items of the second content domain includes (842) at least one of a playback, a subscription corresponding to the first content item of the plurality of content items of the second content domain, a purchase corresponding to the first content item of the plurality of content items of the second content domain, completion of the first content item of the plurality of content items of the second content domain, or feedback for the first content item of the plurality of content items of the second content domain.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for providing content to a user, comprising:
   at a computer having a processor and memory storing instructions for execution by the processor:
     obtaining user data corresponding to a first content domain;
     determining, for a respective user a plurality of labels based on the user data, wherein each label of the plurality of labels corresponds to a distinct characteristic of at least (i) contextual information and (ii) content items of the first content domain;
     before obtaining, for the respective user, data corresponding to a second content domain distinct from the first content domain, utilizing a neural network to generate a user embedding, wherein the user embedding is based on the plurality of labels for the respective user;
     determining one or more content items of a plurality of content items of the second content domain consumed by at least one user other than the respective user; and
     generating, for each content item of the one or more content items of the plurality of content items of the second content domain consumed by at least one user, a respective content item embedding, wherein the respective content item embedding is based on a respective user embedding of the at least one user;
     determining, using the user embedding and respective content item embeddings of the second content domain, a first content item of a plurality of content items of the second content domain that meets matching criteria for the respective user; and providing to a device of the respective user, information that corresponds to the first content item of the plurality of content items of the second content domain.

2. The method of claim 1, wherein the user data includes at least one of content metadata, collaborative transfer data, or demographic data.

3. The method of claim 2, wherein the content metadata includes content information corresponding to the first content domain, the content information including at least one of an artist, artist affinity, genre, meta-genre, or micro genre.

4. The method of claim 2, wherein the collaborative transfer data includes information about a context in which the first content domain is consumed.

5. The method of claim 1, wherein the user data includes at least two of content metadata, collaborative transfer data, and demographic data; and
wherein the plurality of labels corresponding to the user data for the respective user is concatenated.

6. The method of claim 1, wherein determining the first content item of the plurality of content items of the second content domain that meets matching criteria for the respective user includes determining consumption data corresponding to the plurality of content items of the second content domain for one or more users other than the respective user.

7. The method of claim 1, wherein determining the first content item of the plurality of content items of the second content domain that meet matching criteria for the respective user includes performing importance sampling on the respective content item embeddings of the second content domain and generating a weighted embedding for the first content item.

8. The method of claim 7, wherein determining the first content item of the plurality of content items of the second content domain that meet matching criteria for the respective user includes determining the nearest neighbor between the weighted embedding for the first content item and the respective user embedding.

9. The method of claim 1, wherein the provided information corresponding to the first content item of the plurality of content items of the second content domain is incorporated into the user data corresponding to the respective user.

10. The method of claim 9, including, prior to incorporating the provided information corresponding to the first content item of the plurality of content items of the second content domain into the user data corresponding to the respective user:
receiving, from a device of the respective user, an indication of a response to the first content item of the plurality of content items of the second content domain; and
including, in the provided information corresponding to the first content item of the plurality of content items of the second content domain, the indication of the response to the first content item of the plurality of content items of the second content domain.

11. The method of claim 10, wherein the indication of the response to the first content item of the plurality of content items of the second content domain includes at least one of a playback, a subscription corresponding to the first content item of the plurality of content items of the second content domain, a purchase corresponding to the first content item of the plurality of content items of the second content domain, completion of the first content item of the plurality of content items of the second content domain, or feedback for the first content item of the plurality of content items of the second content domain.

12. The method of claim 1, wherein the plurality of labels is identified concurrently with the generation of the user embedding for the respective user.

13. The method of claim 1, wherein determining the first content item of the plurality of content items of the second content domain that meets matching criteria for the respective user includes:
determining a respective matching criteria value for a respective content item of one or more content items of the second content domain;
ranking the one or more content items of the second content domain based on a plurality of matching criteria values including the respective matching criteria value; and
wherein the first content item of the plurality of content items of the second content domain is a most highly ranked content item of the second content domain.

14. The method of claim 13, further comprising:
providing, to the device of the respective user, information corresponding to the one or more ranked content items of the second content domain in descending order based on rank.

15. The method of claim 1, wherein the first content domain includes music.

16. The method of claim 1, wherein the second content domain includes podcast content.

17. A server for providing content to a user comprising:
one or more processors; and
memory storing instructions for execution by the one or more processors, the instructions including instructions for:
obtaining user data corresponding to a first content domain;
determining, for a respective user a plurality of labels based on the user data, wherein each label of the plurality of labels corresponds to a distinct characteristic of at least (i) contextual information and (ii) content items of the first content domain;
before obtaining, for the respective user, data corresponding to a second content domain distinct from the first content domain, utilizing a neural network to generate a user embedding, wherein the user embedding is based on the plurality of labels for the respective user;
determining one or more content items of a plurality of content items of the second content domain consumed by at least one user other than the respective user; and
generating, for each content item of the one or more content items of the plurality of content items of the second content domain consumed by at least one user, a respective content item embedding, wherein the respective content item embedding is based on a respective user embedding of the at least one user;
determining, using the user embedding and respective content item embeddings of the second content domain, a first content item of a plurality of content items of the second content domain that meets matching criteria for the respective user; and
providing to a device of the respective user, information that corresponds to the first content item of the plurality of content items of the second content domain.

18. The server of claim 17, wherein the user data includes at least two of content metadata, collaborative transfer data, and demographic data; and wherein the plurality of labels corresponding to the user data for the respective user is concatenated.

19. A non-transitory computer-readable storage medium for providing content to a user having one or more processors and memory storing instructions for execution by the one or more processors, the instructions including instructions for:

obtaining user data corresponding to a first content domain;

determining, for a respective user a plurality of labels based on the user data, wherein each label of the plurality of labels corresponds to a distinct characteristic of at least (i) contextual information and (ii) content items of the first content domain;

before obtaining, for the respective user, data corresponding to a second content domain distinct from the first content domain, utilizing a neural network to generate a user embedding, wherein the user embedding is based on the plurality of labels for the respective user;

determining one or more content items of a plurality of content items of the second content domain consumed by at least one user other than the respective user; and generating, for each content item of the one or more content items of the plurality of content items of the second content domain consumed by at least one user, a respective content item embedding, wherein the respective content item embedding is based on a respective user embedding of the at least one user;

determining, using the user embedding and respective content item embeddings of the second content domain, a first content item of a plurality of content items of the second content domain that meets matching criteria for the respective user; and providing to a device of the respective user, information that corresponds to the first content item of the plurality of content items of the second content domain.

\* \* \* \* \*